(12) United States Patent
Jing et al.

(10) Patent No.: US 11,436,272 B2
(45) Date of Patent: *Sep. 6, 2022

(54) OBJECT BASED IMAGE BASED SEARCH

(71) Applicant: Pinterest, Inc., San Francisco, CA (US)

(72) Inventors: Yushi Jing, San Francisco, CA (US); Cai Wei, Pacifica, CA (US)

(73) Assignee: Pinterest, Inc., San Francisco, CA (US)

( * ) Notice: Subject to any disclaimer, the term of this patent is extended or adjusted under 35 U.S.C. 154(b) by 566 days.

This patent is subject to a terminal disclaimer.

(21) Appl. No.: 15/491,951

(22) Filed: Apr. 19, 2017

(65) Prior Publication Data

US 2017/0220602 A1 Aug. 3, 2017

Related U.S. Application Data

(63) Continuation of application No. 14/279,871, filed on May 16, 2014, now Pat. No. 10,515,110.

(Continued)

(51) Int. Cl.
| | |
|---|---|
| *G06F 16/532* | (2019.01) |
| *G06F 16/51* | (2019.01) |
| *G06F 16/2453* | (2019.01) |
| *G06F 16/332* | (2019.01) |
| *G06F 16/58* | (2019.01) |
| *G06F 16/583* | (2019.01) |
| *G06F 16/538* | (2019.01) |

(Continued)

(52) U.S. Cl.
CPC .......... *G06F 16/532* (2019.01); *G06F 3/0482* (2013.01); *G06F 16/2453* (2019.01); *G06F 16/3326* (2019.01); *G06F 16/51* (2019.01); *G06F 16/538* (2019.01); *G06F 16/583* (2019.01); *G06F 16/5866* (2019.01); *G09G 5/14* (2013.01); *G06F 3/013* (2013.01); *G06F 3/0488* (2013.01)

(58) Field of Classification Search
CPC ...... G06F 16/532; G06F 16/583; G06F 16/51; G06F 16/3326; G06F 16/5866; G06F 16/2453; G06F 16/538
USPC ........................................................ 707/766
See application file for complete search history.

(56) References Cited

U.S. PATENT DOCUMENTS

| | | | | |
|---|---|---|---|---|
| 5,579,471 | A | * | 11/1996 | Barber ................. G06K 9/4647 715/700 |
| 5,596,690 | A | * | 1/1997 | Stone ...................... G06T 11/00 345/420 |

(Continued)

FOREIGN PATENT DOCUMENTS

| | | |
|---|---|---|
| CA | 2495046 A1 | 2/2004 |
| JP | H09101970 A | 4/1997 |

(Continued)

OTHER PUBLICATIONS

Extended European Search Report for EP Application No. 14863014.8 dated Mar. 30, 2017.

(Continued)

*Primary Examiner* — Ashish Thomas
*Assistant Examiner* — Nargis Sultana
(74) *Attorney, Agent, or Firm* — Athorus, PLLC

(57) ABSTRACT

Described is a system and method for enabling visual search for information. With each selection of an object included in an image, additional images that include visually similar objects are determined and presented to the user.

20 Claims, 11 Drawing Sheets

Related U.S. Application Data

(60) Provisional application No. 61/902,907, filed on Nov. 12, 2013.

(51) Int. Cl.
| | |
|---|---|
| *G06F 3/0482* | (2013.01) |
| *G09G 5/14* | (2006.01) |
| G06F 3/01 | (2006.01) |
| G06F 3/0488 | (2022.01) |

(56) References Cited

U.S. PATENT DOCUMENTS

| | | | |
|---|---|---|---|
| 6,446,081 B1* | 9/2002 | Preston | G06F 40/30 |
| 7,117,519 B1 | 10/2006 | Anderson et al. | |
| 8,171,049 B2* | 5/2012 | Ah-Pine | G06F 16/54 |
| | | | 707/772 |
| 8,429,168 B1* | 4/2013 | Chechik | G06K 9/6276 |
| | | | 707/741 |
| 8,909,563 B1 | 12/2014 | Jing et al. | |
| 9,087,078 B2* | 7/2015 | Becherer | G06F 16/3328 |
| 9,098,741 B1* | 8/2015 | Anguelov | G06K 9/3241 |
| 2004/0013286 A1* | 1/2004 | Viola | G06K 9/00268 |
| | | | 382/118 |
| 2004/0088291 A1* | 5/2004 | Matsuzaki | G06F 16/50 |
| 2005/0031165 A1* | 2/2005 | Olson | G06T 7/20 |
| | | | 382/103 |
| 2005/0225678 A1* | 10/2005 | Zisserman | G06F 16/5838 |
| | | | 348/571 |
| 2006/0018521 A1* | 1/2006 | Avidan | G06K 9/4609 |
| | | | 382/118 |
| 2006/0020597 A1* | 1/2006 | Keating | G06F 16/5838 |
| 2006/0112092 A1 | 5/2006 | Ziou et al. | |
| 2006/0251292 A1 | 11/2006 | Gokturk et al. | |
| 2007/0071323 A1* | 3/2007 | Kontsevich | G06F 16/7847 |
| | | | 382/190 |
| 2007/0081729 A1* | 4/2007 | Ogawa | G06F 16/532 |
| | | | 382/209 |
| 2007/0177805 A1* | 8/2007 | Gallagher | G06F 16/58 |
| | | | 382/190 |
| 2007/0286531 A1* | 12/2007 | Fu | G06F 16/532 |
| | | | 382/305 |
| 2008/0212899 A1* | 9/2008 | Gokturk | G06Q 30/0603 |
| | | | 382/305 |
| 2010/0061634 A1* | 3/2010 | Howie | G06F 16/313 |
| | | | 382/176 |
| 2010/0082597 A1 | 4/2010 | Retterath et al. | |
| 2010/0106732 A1* | 4/2010 | Atallah | G06F 16/907 |
| | | | 707/749 |
| 2010/0205142 A1 | 8/2010 | Feulner et al. | |
| 2010/0226564 A1 | 9/2010 | Marchesotti et al. | |
| 2010/0226566 A1* | 9/2010 | Luo | G06T 11/60 |
| | | | 382/164 |
| 2011/0081090 A1* | 4/2011 | Bouguet | G06K 9/6253 |
| | | | 382/224 |
| 2011/0194761 A1 | 8/2011 | Wang et al. | |
| 2011/0268323 A1* | 11/2011 | Gallagher | G06F 16/58 |
| | | | 382/118 |
| 2011/0286638 A1* | 11/2011 | Tedesco | H04L 63/08 |
| | | | 382/115 |
| 2011/0320317 A1 | 12/2011 | Yuan et al. | |
| 2012/0123976 A1* | 5/2012 | Wang | G06N 20/00 |
| | | | 707/723 |
| 2012/0194681 A1 | 8/2012 | Atsmon et al. | |
| 2012/0294520 A1 | 11/2012 | Mei et al. | |
| 2013/0007620 A1* | 1/2013 | Barsook | G06F 3/04842 |
| | | | 715/719 |
| 2013/0132236 A1* | 5/2013 | Gokturk | G06Q 30/0643 |
| | | | 705/26.61 |
| 2013/0185288 A1* | 7/2013 | Nishiyama | G06F 16/248 |
| | | | 707/722 |
| 2013/0188886 A1* | 7/2013 | Petrou | G06K 9/228 |
| | | | 382/305 |
| 2013/0218858 A1* | 8/2013 | Perelman | G06F 16/9535 |
| | | | 707/706 |
| 2013/0251273 A1* | 9/2013 | Westphal | G06T 3/4023 |
| | | | 382/218 |
| 2013/0282712 A1 | 10/2013 | Brandt | |
| 2013/0332958 A1* | 12/2013 | Yang | G01S 3/7864 |
| | | | 725/38 |
| 2014/0074453 A1* | 3/2014 | Katsuno | G06F 16/438 |
| | | | 704/2 |
| 2014/0267409 A1* | 9/2014 | Fein | G06F 3/011 |
| | | | 345/633 |
| 2014/0317486 A1* | 10/2014 | Lee | G06F 40/134 |
| | | | 715/208 |
| 2015/0063725 A1* | 3/2015 | Tai | G06V 10/235 |
| | | | 382/306 |
| 2015/0134688 A1* | 5/2015 | Jing | G06F 16/5866 |
| | | | 707/766 |
| 2015/0178317 A1* | 6/2015 | Spielberg | G06F 16/58 |
| | | | 382/165 |
| 2015/0248429 A1 | 9/2015 | Pregueiro et al. | |
| 2016/0005171 A1* | 1/2016 | Watanabe | G06K 9/00677 |
| | | | 382/118 |

FOREIGN PATENT DOCUMENTS

| | | |
|---|---|---|
| JP | 2004152110 A | 5/2004 |
| JP | 2007058532 A | 3/2007 |
| JP | 2010122931 A | 6/2010 |
| JP | 2010250426 A1 | 11/2010 |
| JP | 2012203645 A | 10/2012 |
| JP | 2013092941 A | 5/2013 |

OTHER PUBLICATIONS

International Search Report and Written Opinion for PCT Application No. PCT/US2016/031914 dated Aug. 16, 2016.
International Search Report and Written Opinion for PCT Application No. PCT/US2016/055212 dated Dec. 23, 2016.
International Search Report for PCT Application No. PCT/US2014/064871 dated Feb. 6, 2015.
Office Action for Japanese Patent Application No. 2016-530236 dated Jul. 31, 2017.

* cited by examiner

OBJECT BASED IMAGE BASED SEARCH

PRIORITY CLAIM

This application is a continuation of U.S. patent application Ser. No. 14/279,871, filed May 16, 2014, entitled "IMAGE BASED SEARCH," and claims the benefit of U.S. provisional application No. 61/902,907, filed Nov. 12, 2013 entitled "HIERARCHY OF OBJECTS COMPONENTS FOR PRODUCT RECOMMENDATION, CONTEXTURAL ADVERTISING AND PORNOGRAPHY REMOVAL," each of which are incorporated herein by reference in their entirety.

BACKGROUND

With the ever expanding amount of accessible digital content available to users and customers, it continues to become more and more difficult to discover the content for which the user is searching. Several different search techniques exist, such as keyword searching, but there are many inefficiencies in such systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
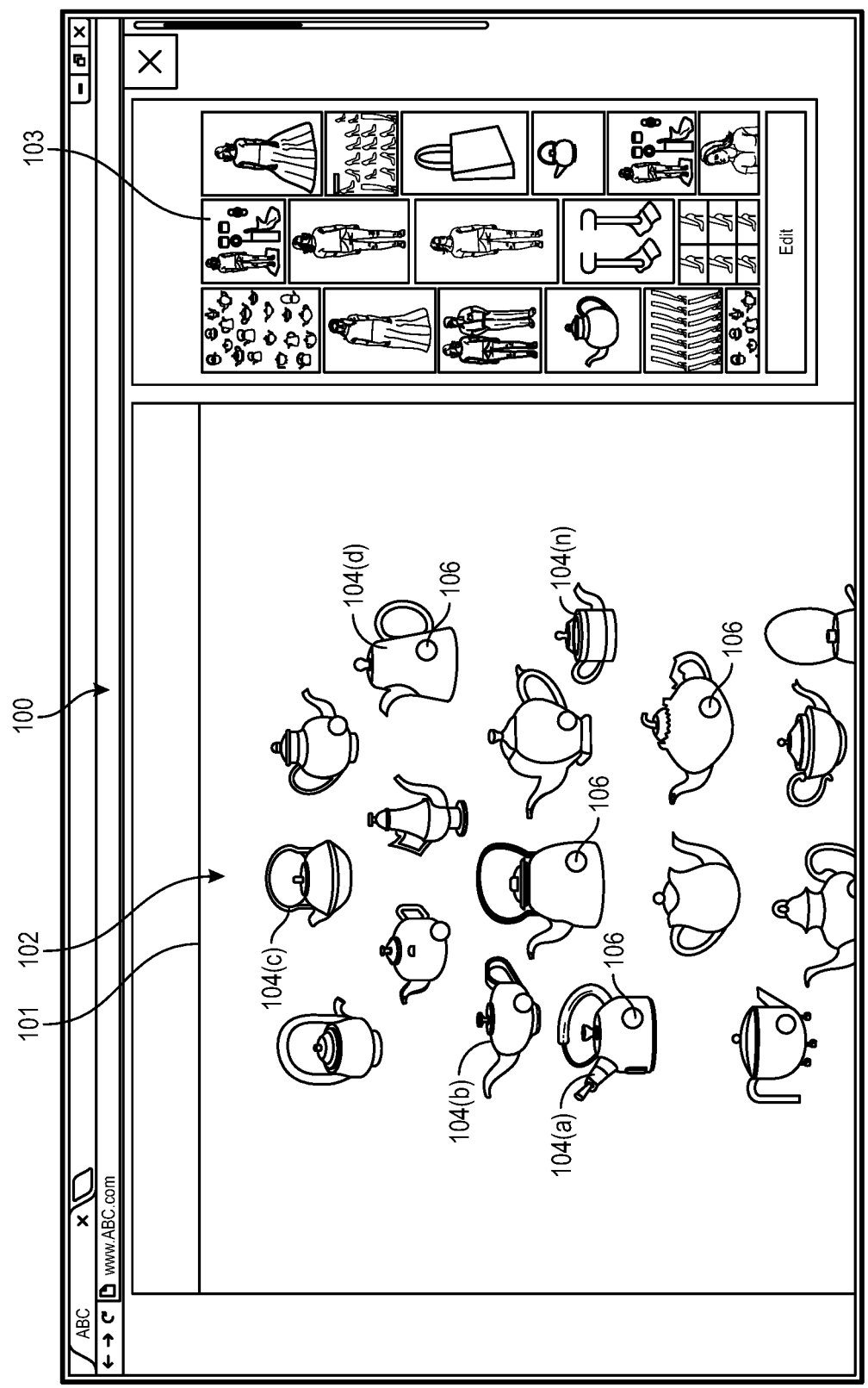
FIGS. 1-3 are representations of a graphical user interface for selecting an object of interest, in one implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Described herein is a system and method that facilitates searching for information based on a selection of one or more objects of interest from a larger image and/or video. In many image based queries (e.g., fashion design, interior design), what interests the user is not an entire image, but specific objects (e.g., dress, couch, lamp) represented in the image, and how those objects are put together (e.g., the stylistic selection between the shirt and the skirt, the placement of a couch relative to a television).

In one implementation, a user may begin a search by selecting (e.g., using a touch-based display, pointing device, mouse) an object of interest from within a presented image. Based on the selected object of interest, other similar objects are determined and presented to the user. For example, if an image of a woman is presented to the user and the user selects the shoes (object of interest) included in the image of the woman, images of other shoes visually similar (e.g., size, shape, color, style, brand) to the selected shoes are determined and presented to the user. A user may select one of the presented images, select additional and/or other objects of interest, or perform other actions.

In some implementations, objects included in an image may be predetermined and visually distinguished for selection by the user. Likewise, other images that include similar objects may also be associated with the objects in the image such that if a user selects one of the objects of interest, images including similar objects can be quickly presented to the user.

In still further implementations, a user may select multiple objects of interest and/or may specify whether a selected object of interest is a positive object of interest or a negative object of interest. Positive objects of interest are objects selected by the user for which they are interested in seeing images with other, visually similar objects. Negative objects of interest are objects selected by the user which the user does not want included in other images. For example, if a user selects from an image, positive objects of interest of a chair and a lamp and a negative object of interest of a rug, the implementations described herein will identify other images that include a chair and a lamp but do not include a rug.

Figure 2:
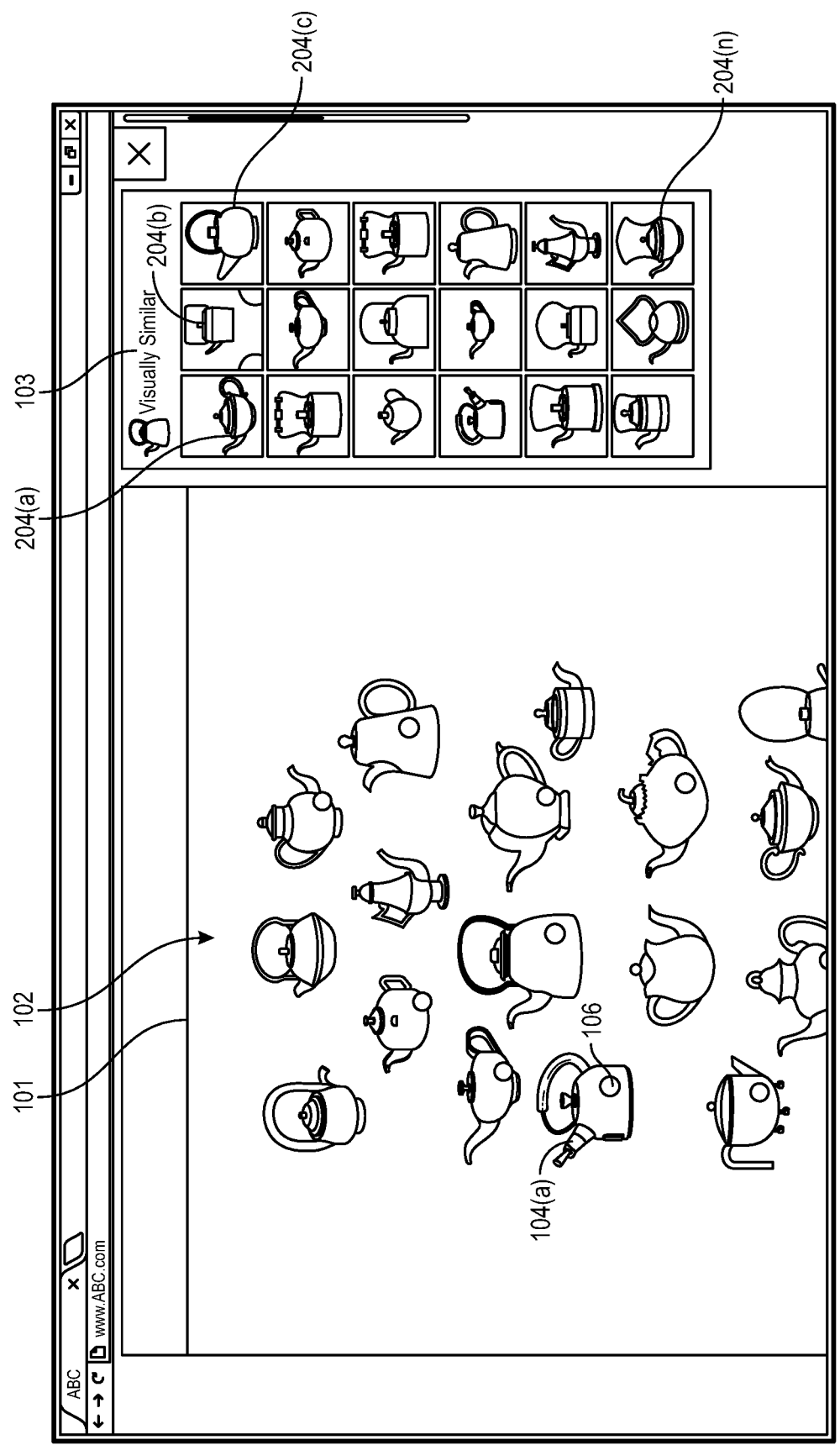
Figure 3:
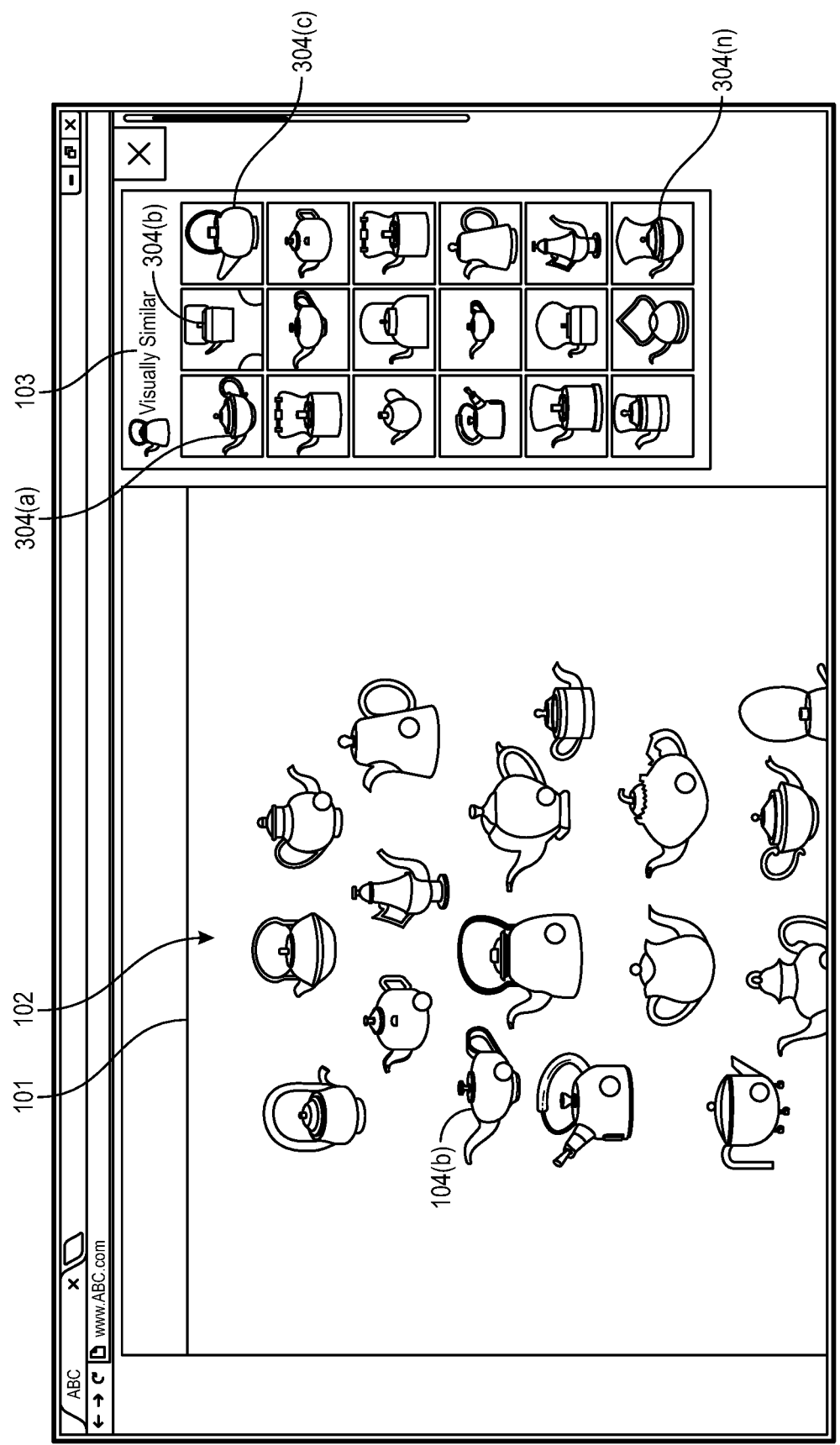

FIGS. 1-3 are representations of a graphical user interface for selecting an object of interest, in one implementation. A user may be presented with a graphical user interface via a client device. A client device may include, for example, personal computers, tablet computers, eBook reader devices, laptop computers, desktop computers, netbooks, personal digital assistants (PDA), portable gaming devices, wireless communication devices, such as smart phones or mobile handsets, set-top boxes, game consoles, cameras, audio recorders/players, or any combination thereof. Utilizing a client device, a user may interact with the presented information, selecting objects of interest and/or performing other actions.

Turning first to FIG. 1, illustrated is a user interface 100 that includes a first window 101 and a second window 103. Presented in the first window is an image 102 that includes representations of multiple objects 104(*a*), 104(*b*), 104(*c*), 104(*d*)-104(*n*). Often, images, such as image 102, include multiple discrete objects 104 (e.g., pots, lamps, dresses, shoes, sunglasses, cars, buildings). For example, as illustrated in FIG. 1, the image 102 includes multiple representations of different size and shape tea pots (objects). When a user is searching for information and/or items, they are often only interested in specific objects included in a represented image 102, rather than the entire image 102. For example, the user may only be interested in tea pots of a similar size and shape as tea pot 104(a) represented in the image 102.

To obtain additional information and/or other images that include visually similar objects, a user may select an object 104. A selected object is referred to herein as an "object of interest" and an object within an image that may be selected is referred to herein as a "potential object of interest." In some implementations, any representation of an object included in an image may be a potential object of interest and selected by a user as an object of interest. Determination of an object may be performed upon selection of the object by the user. For example, the image may not be parsed to identify potential objects of interest until a selection of an object is received. When a user provides an input selecting a portion of an image, the location of the input may be determined, the image processed and an object corresponding to the selected location determined to be the selected object of interest.

In other implementations, such as that illustrated in FIG. 1, the image may be pre-processed to identify potential objects of interest. In such an implementation, selection controls 106 may be presented on or adjacent to each potential object of interest to identify to the user that the object may be selected as an object of interest. In some implementations, the selection controls may be continually visible on the display to allow the user to identify objects available for selection. In other implementations, the selection controls may be selectively presented. For example, the controls may be initially be presented for a defined period of time (e.g., the first five seconds of presenting the image) and/or presented in response to specific user actions. For example, the selection controls may be presented when the user moves the pointer on the display, when the user touches the display, etc.

In still other implementations, the image may be pre-processed and potential objects of interest visually distinguished to the user with selection controls 106 and/or the user may select other objects within the image. If the user selects an object represented in the image that has not been determined and distinguished with a selection control 106, the location of the input may be determined and that portion of the image processed to determine the selected object.

As illustrated in FIG. 2, upon selection of an object of interest, additional images that include objects that are visually similar to the object of interest are determined and at least a portion of those images are presented to the user in the second window 103 concurrently with the image 102 presented in the first window 101. In this example, the user has selected the tea pot 104(a) that includes the selection control 106. Additional images that include visually similar (e.g., similar shape, size, color) to that of the selected object of interest (tea pot 104(a)) are determined. Techniques for determining additional images are discussed further below.

Images that are determined to include an object that is visually similar to the selected object of interest may then be ranked and those having the highest rank (e.g., based on visual similarity to the selected object of interest) are presented in the second window 103. In this example, only the portion of the additional images that includes the visually similar object is presented to the user. For example, representations of visually similar objects 204(a), 204(b), 204(c)-204(n) are determined and presented to the user.

A user may select a representation of a visually similar object and the image that includes that representation will replace the image 102 included in the first window 101. Alternatively, the user may select another potential object of interest included in the image 102 presented in the first window 101. For example, referring to FIG. 3, if the user selects the potential object of interest 104(b), images that include representations of objects that are visually similar to the selected object of interest 104(b) are determined and presented to the user via the second window. Similar to the discussion provided with respect to FIG. 2, only a portion of the images with objects visually similar to the selected object of interest are presented in the second window 103. Specifically, the portion of the image that includes the visually similar object 304(a), 304(b)-304(n) is presented in the second window 103. A user may continue to select different objects from the image 102 and be presented with representations of visually similar objects via the second window 103. Alternatively, the user may select one of the representations 304(a)-304(n) of the visually similar objects and the image that includes the selected visually similar object will be presented in the first window 101, replacing the image 102.

Figure 4:
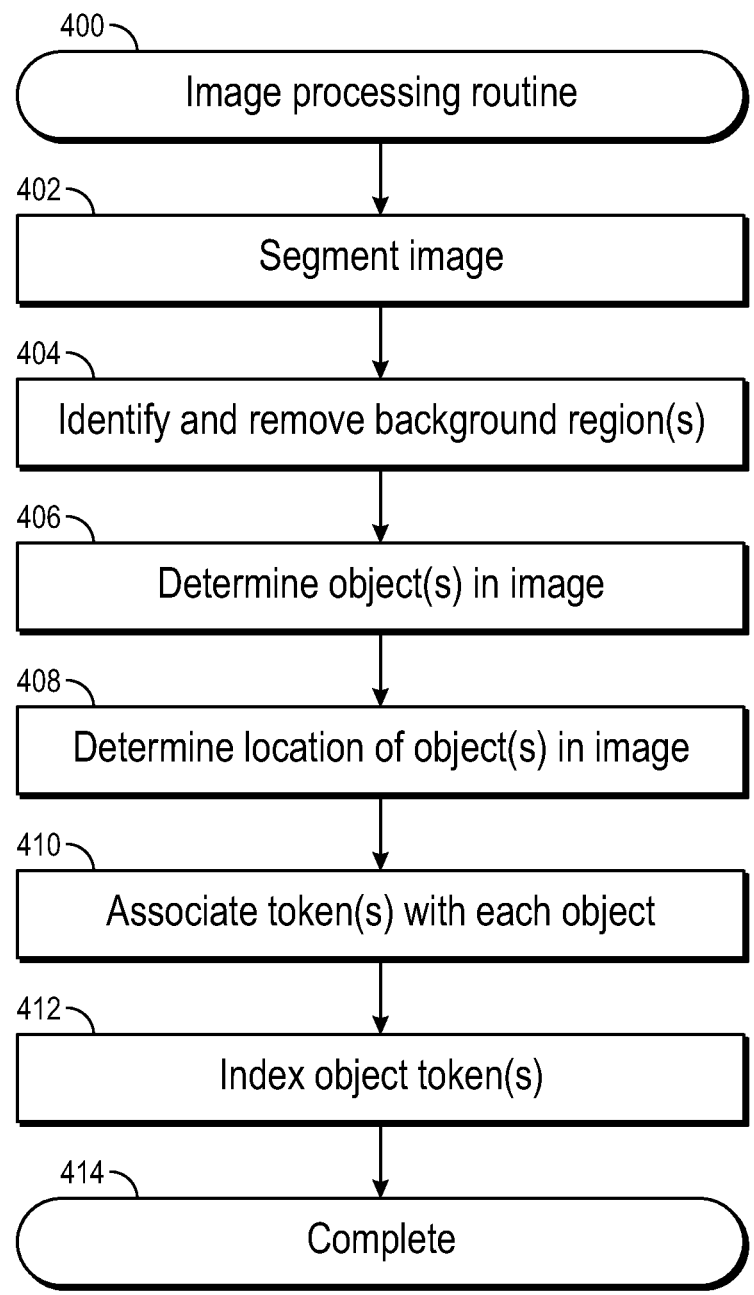
FIG. 4 is a flow diagram illustrating an example image processing routine, according to an implementation.

FIG. 4 is a flow diagram illustrating an example image processing routine, according to an implementation. This routine, and each routine described herein, may be implemented by the architectures described herein or by other architectures. The routine is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 400 begins by segmenting an image, in 402. Any variety of segmentation techniques, such as circle packing algorithm, super-pixels, etc., may be used. The segments may then be processed to remove background portions of the image from consideration, in 404. Determining background segments may be done, for example, using a combination of attentive constraints (e.g., salient objects are likely to be at the center of the image) and unique constraints (e.g., salient objects are likely to be different from the background). In one implementation, for each segment ($S_i$), a unique constraint may be computed using a combination of color, texture, shape and/or other feature detection. The pairwise Euclidian distances for all pairs of segments: $L2(S_i, S_j)$ may also be computed for $\forall S_i \in S$, $\forall S_j \in S$. The unique constraint U for segment $S_i$, or $U_i$, may be computed as $U_i = \Sigma_j L2(S_i, S_j)$. The attentive constraint for each Segment $S_i$ may be computed as $A=[X(s)-X']^2+[Y(s)-Y']^2$, where X' and Y' are the center coordinates of the image. One or more of the segments S', a subset of S, may then be selected such that U(s)−A(s)>t, where t is a threshold set manually or learned from the data. The threshold t may be any defined number or amount utilized to distinguish segments as background information or potential objects. Alternatively, Similarity($s'_i \in S', r_i \in R-$) and Similarity($s'_i \in S', r_i \in R+$), where $s'_i$ an element of S' and $r_i$ is an element R−, and R− is a set of image non-salient regions (background), may be computed and used as the similarity between each segment to a labelled database of labelled salient segments and non-salient segments. The final score is:

$$U(s'_i)-A(s'_i)+\text{Similarity}(s'_i \in S', r_i \in R+)-\text{Similarity}(s'_i \in S', r_i \in R-) > t$$

In another implementation, the selection of the parts-of-interest to the past interaction of the same user may be determined. The final segment S' may then be clustered to form one or more groups, where each group is a distinctive part of the image.

Returning to FIG. 4, upon removing the background segments, the objects remaining in the image are determined, in 406. Objects remaining in the image may be determined, for example, by using a sliding window approach to compute the score of each possible hypothesis of the location of the object. Using approaches such as boosted selection of Harr-like wavelets, or multiple-parts based models, each segment may be processed to determine potentially matching objects. For example, an image vector may be determined for a segment and compared to information stored for objects. Based on the image vector and the stored information, a determination may be made as to how similar the image vector is to the stored information for particular objects.

The sliding window approach may be performed N times, each with a different trained object classifier (e.g., person, bag, shoes, face, arms, etc.). After determining a hypotheses for each object classifier, the output is a set of best hypothesis for each object class. Because objects do not generally appear randomly in images (e.g., eyes and noses typically appear together), position-sensitive constraints may also be considered. For example, positions of the root object (e.g., person) may be defined as W(root) and each geometric constraint for each object k may be denoted with respect to each other as $\vec{\lambda_k}(O)$, a 6-element vector. The geometric "fit" of each landmark $W_{oi}$ with respect to the root object $W_{root}$ may be defined by $\mathcal{L}(\vec{\lambda}(i)(W_o)*\Theta)$, $\Theta_i=[dy, dx^2, dy^2, dxdy, z]$, where dx, dy are the average geometric distance between each pixel in the object box $W_{oi}$ and each pixel in the root object box. The problem of finding optimal $\vec{\lambda_k}$ can be formulated as, arg min$\lambda_i \mathcal{L}(\vec{\lambda}(i)*D_{train}(\Theta_i))$ where $D_{train}(\Theta_i)$ is the observed value of $\Theta_i$ in training images.

To optimize this function, the location of the objects in the image may be determined, in 408. For example, the center of a root object (e.g., person) in the image is marked as (0, 0), and the location of other objects in the processed images is shifted with respect to the root object. A linear-Support Vector Machine (SVM) is then applied with $\Theta_i$ as parameters. The input to the SVM is $D_{train}(\Theta_i)$. Other optimizing approaches, such as linear programming, dynamic programming, convex optimizations, and the like, may also be used alone or in combination with the optimization discussed herein. The training data $D_{train}(\Theta_k)$, can be collected by having users place a bounding box on top of both the entire object and the landmarks. Alternatively, semi-automated approaches, such as facial detection algorithms, edge detection algorithms, etc., may be utilized to identify objects. In some implementations, other shapes, such as ovals, ellipses, and/or irregular shapes may be used to represent objects.

Figure 11:
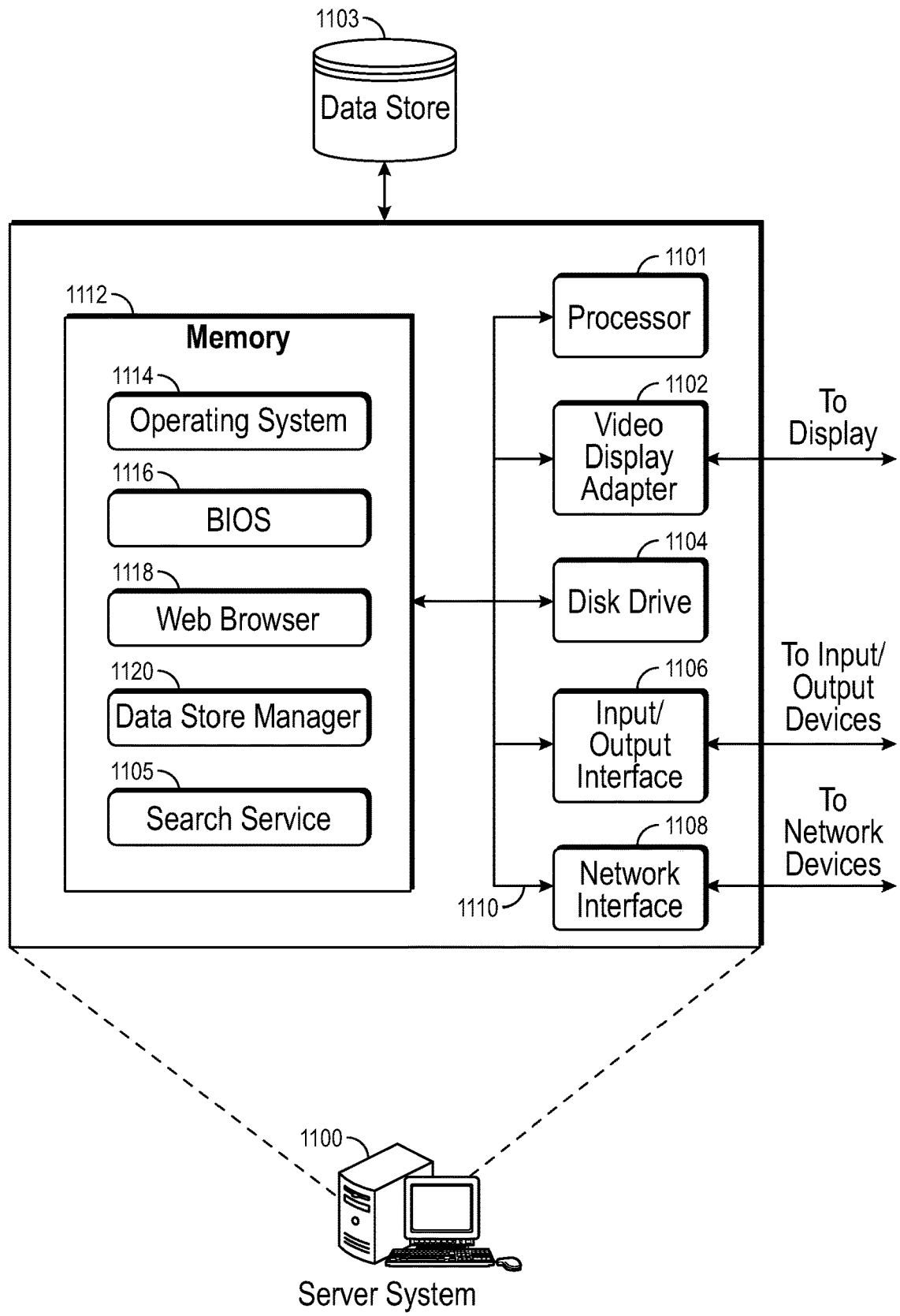
FIG. 11 is a pictorial diagram of an illustrative implementation of a server system that may be used for various implementations.

Returning to FIG. 4, a token is associated with each identified object, in 410. Specifically, the bounding box that contains the object may be associated with a token and the association maintained in a data store 1103 (FIG. 11). The token may be a unique identifier representative of the object. Alternatively, the tokens may include classification information. For example, tokens associated with representations of clothing may include an apparel classifier (such as a prefix classifier) in addition to a unique identifier for the object. In other implementations, a set of image features (e.g., color, shape, texture) may be computed for each object in the image and the set may be concatenated to form a single feature vector representative of the representation of the object. The single feature vector may then be translated into a visual-token through the user of visual vocabularies. Visual vocabularies may be generated by running clustering algorithms (e.g., K-means) on features generated from a large dataset of images and the center of the cluster becomes the vocabulary set. Each single feature vector is translated to one or more vocabulary terms that is the most similar to the feature space (e.g., Euclidian distance).

After associating a token with each object represented in the image, the objects are indexed, in 412. Each object may be indexed using standard text-based retrieval techniques. However, unlike standard text or visual search, multiple indexes may be maintained in the data store 1103 (FIG. 13) and each object may be associated with one or more of the multiple indexes. As discussed further below, a user may make one or multiple selections of objects represented in an image. Each selection may be associated with an action-ID (positive selection, negative selection). The indexed images and tokens may be utilized to identify other objects that are visually similar to the selected objects represented in the image. After processing the image, the example process 400 completes, in 414.

Figure 5:
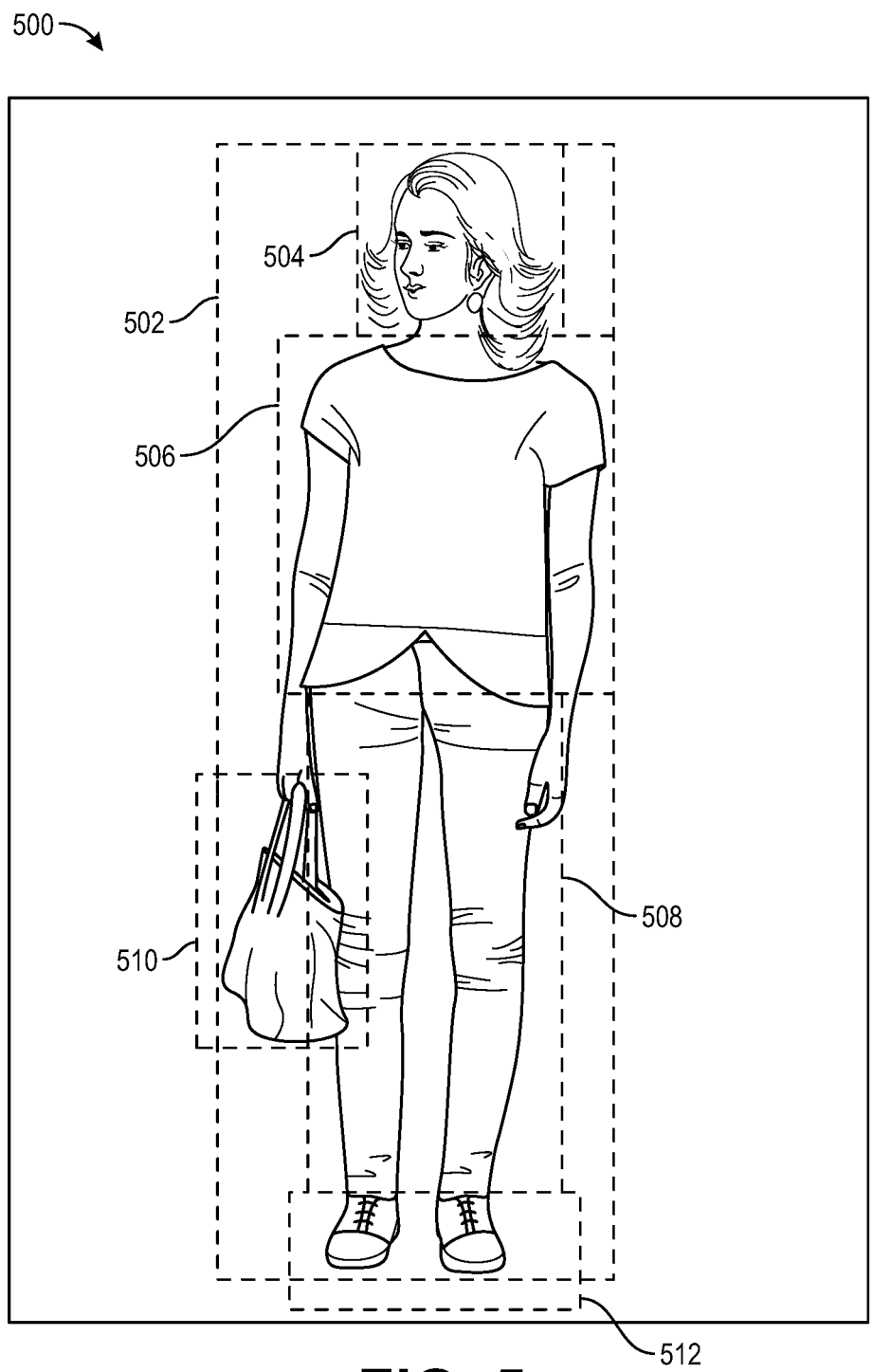
FIG. 5 is a representation of a segmented image, according to an implementation.

FIG. 5 is a representation of a segmented image, according to an implementation. An image, such as image 500, may be segmented using the segmentation techniques discussed above. Using the example routine 400, the background segments have been removed and six objects in the image have been segmented and identified. Specifically, a body object 502, a head object 504, a shirt object 506, a pants object 508, a bags object 510, and a feet object 512. As part of the segmenting, the root object, in this example the body object 502, was determined and the location of other objects 504-512 considered when identifying those other objects.

In other implementations, an image may be segmented using other segmentation and identification techniques. For example, images may be segmented using crowd sourcing techniques. For example, as users view an image, they may select regions of the image that include objects and label those objects. As more users identify objects within images, the confidence of the identity of those objects increases. Based on the user provided segmentation and identification, the objects within the image can be indexed and associated with other visually similar objects included in other images.

Figure 6:
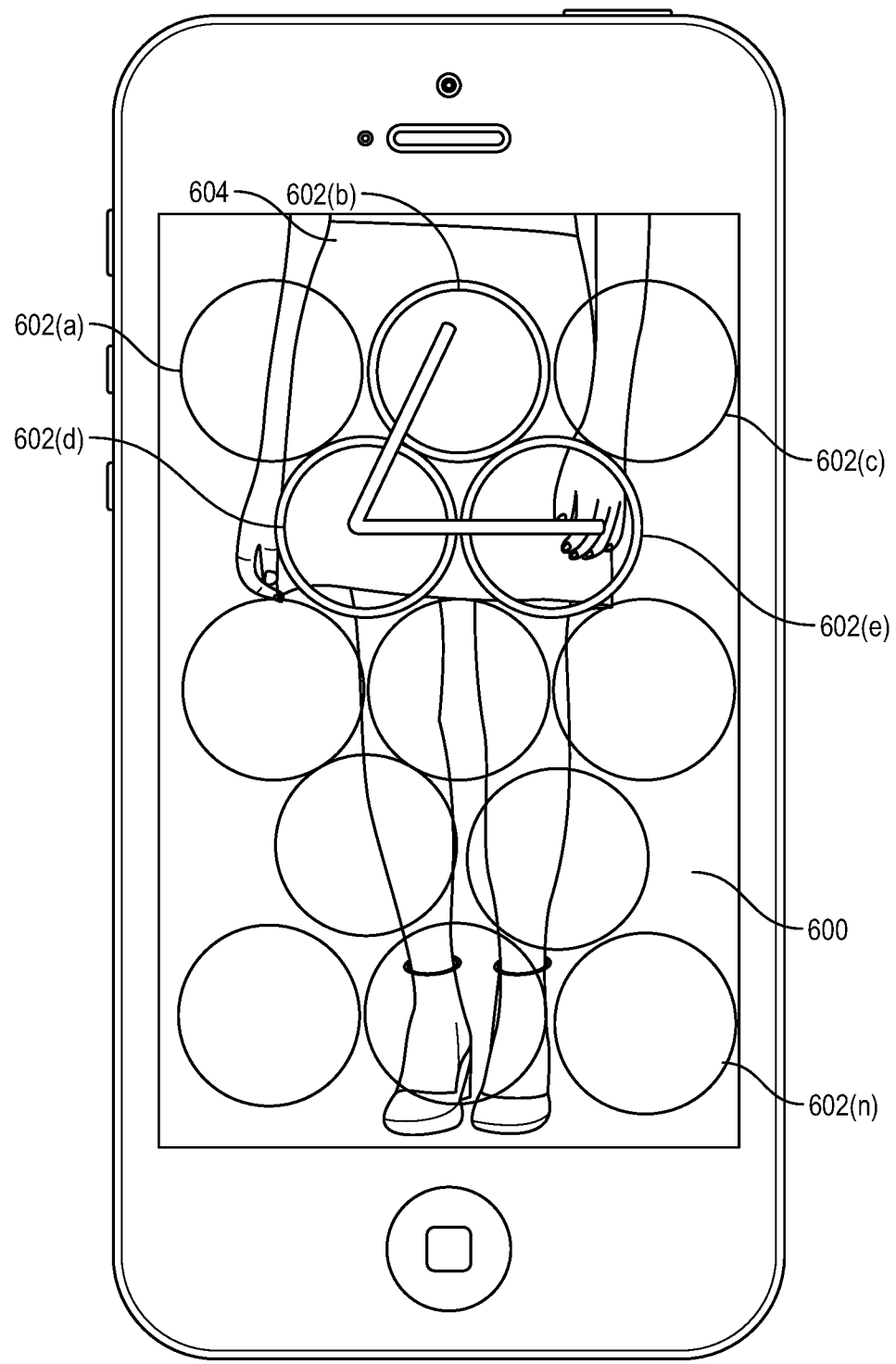
FIG. 6 is a representation of a graphical user interface for selecting an object of interest, in one implementation.

Users may select segments and/or objects within an image using a variety of selection techniques. For example, FIG. 6 illustrates an example of an image 600 being preliminarily segmented into series cells 602(a)-602(e). A user may specify an object by selection (e.g., touching) each of the cells that include the object. In this example, the user has selected the representation of a skirt 604 by selecting cells 602(b), 602(d), 602(e). The preliminary segmentations may be visually presented to the user along with the representation of the object. In other implementations, the preliminary segmentation may be maintained virtually and not presented. In such an implementation, the location of the user provided input may be determined and the corresponding preliminary segments identified. As a group of segments are identified, they may be joined to form a single segment or bounding region around the specified object.

Figure 7:
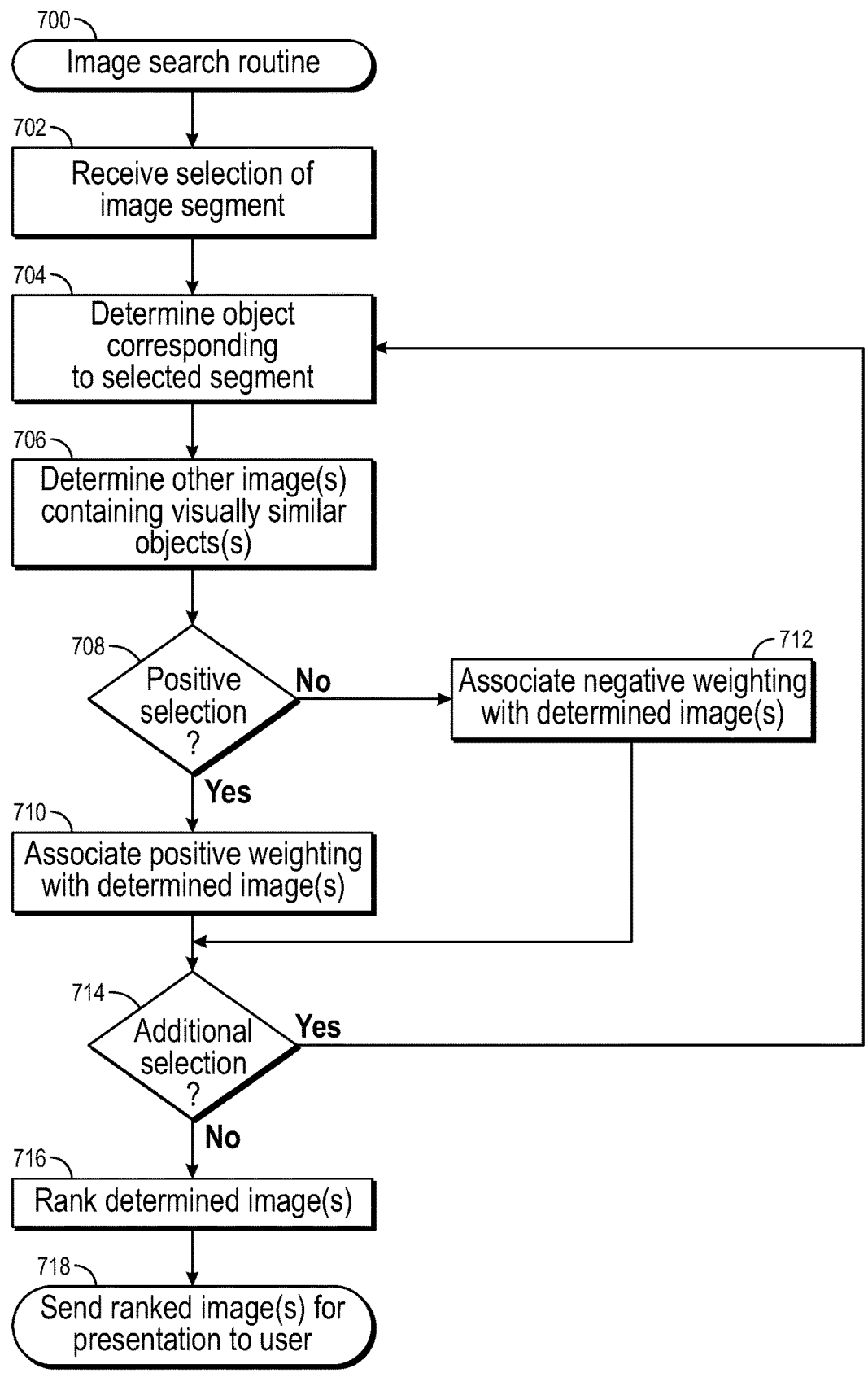
FIG. 7 is a flow diagram illustrating an example image search routine, according to an implementation.

FIG. 7 is a flow diagram illustrating an example image search routine 700, according to an implementation. The example routine 700 begins by receiving a selection of a segment of an image, in 702. As discussed above, a user may select a segment of an image using, for example, an input device (e.g., finger, mouse, cursor, keyboard) to select a segment of an image. In other implementations, a segment of an image may be determined based on a determined gaze position of a user. For example, the client device may include one or more image capture components (e.g., cameras) that capture images of a user looking at a display of the client device. The images may be processed to determine a gaze of the user and a corresponding segment of the image selected.

Based on the location of the selected segment within the image, an object corresponding to the segment is determined, in 704. The location of an object within an image may be determined based on a distance from a root object, center point of an image, etc. The location of the received selection correlates to a location of the object and the corresponding object may thus be determined.

Based on the determined object, one or more additional images containing visually similar objects may be determined. For example, as objects are indexed by object type, as discussed above, when an object is selected, the index data store for that object type may be queried to identify other images associated with the same index. Images with objects determined to be visually similar may be ranked or weighted based on how similar the representation of the selected object is to the object represented in the additional image. For example, a single feature vector of the selected object may be compared to feature vectors of the visually similar objects to determine a similarity between the objects. Additional, visually similar objects may receive a higher weighting or similarity score.

In addition to determining additional images with visually similar objects, a determination may be made as to whether the selection is a positive selection or a negative selection. In some implementations, a user may specify whether a selection is positive (an object of interest for which the user is interested in seeing images with other, visually similar objects) or negative (an object of interest which the user does not want included in other images). If it is determined that the selected object of interest is a positive object of interest, in 708, a positive weighting may be applied to the determined images and/or the determined similarity score for those images, in 710. In comparison, if it is determined that the selection is negative, a negative weighting may be applied to the determined images and/or the determined similarity score for those images, in 712.

After associating a weighting with the determined images, a determination may be made as to whether additional objects within the image have been selected, in 714. If additional objects in the image have been selected, the example routine 700 returns to block 704 and continues. As discussed herein, in some implementations, a user may select multiple objects within an image and/or associate a positive or negative indication with each selection. If multiple objects are selected, the similarity score for each visually similar image may be considered and images with multiple selected objects may have their similarity scores combined. Likewise, in some implementations, a user may select objects from multiple images and have those objects considered (as either positive or negative objects of interest) to determine other visually similar objects.

If it is determined that there are no additional selections of objects, the similarity score of each determined image is ranked, in 716, and the highest ranked images are sent for presentation to the user, in 718. As discussed above, in some implementations, only a portion of an image with a visually similar object may be sent for presentation to the user. For example, only the segment of the additional image that includes the visually similar object may be sent for presentation to the user. In other implementations, the entire additional image containing the visually similar object may be sent for presentation to the user.

Figure 8A:
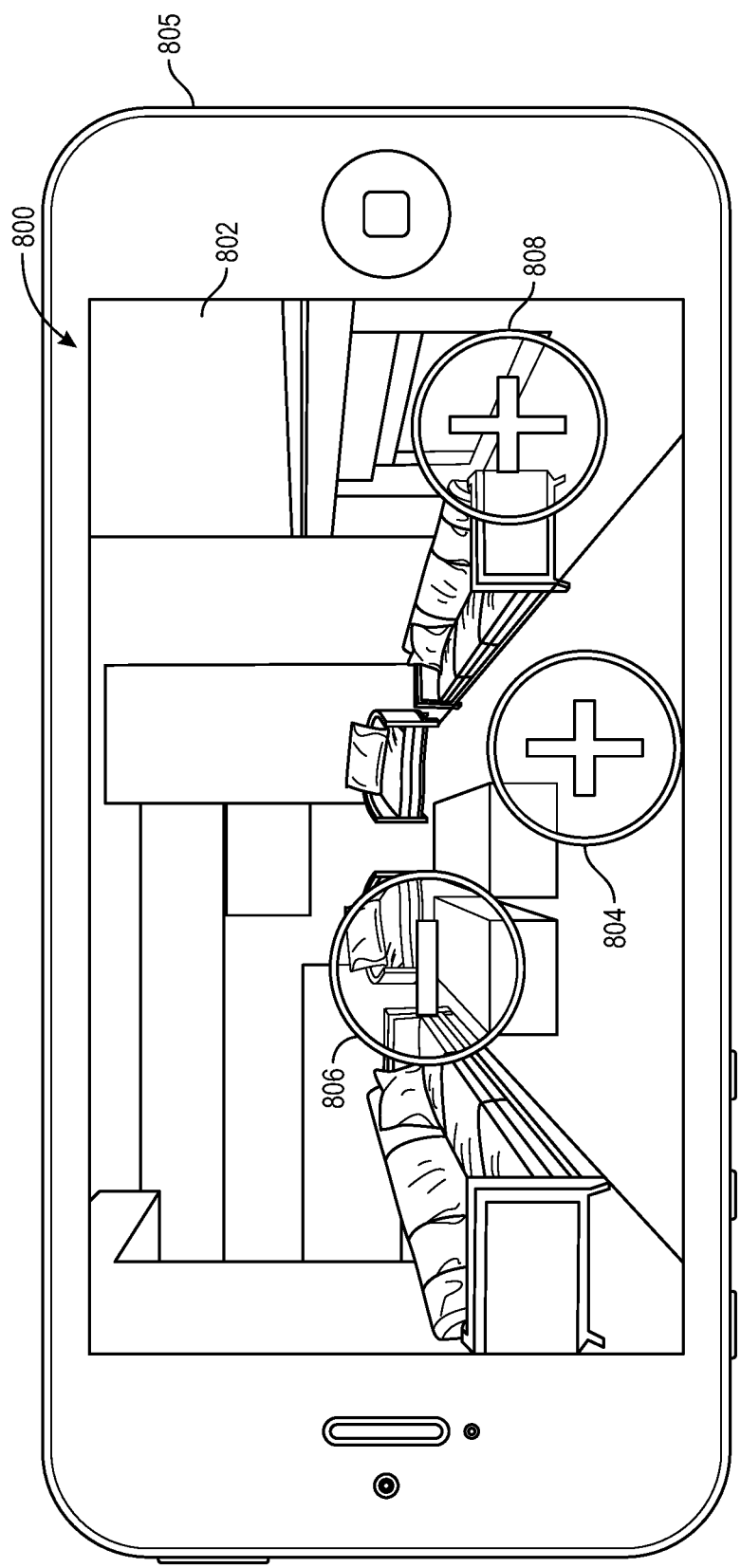
FIG. 8A is a representation of a graphical user interface for selecting an object of interest, in one implementation.

FIG. 8A is a representation of a graphical user interface 800 presented on a client device 805 that includes an image 802, in one implementation. In this example, the user has selected three objects 804, 806, 808 represented in the image 802. Positive selections are presented with a "+" representation while negative selections are presented with a "−" representation. In one implementation, a user may provide a positive selection of an object of interest by selecting the object once. A negative selection of an object of interest may be provided by selecting the object twice.

In this example, the user has provided a positive selection 804 for the rug represented in the image, a positive selection 808 for the chair represented in the image and a negative selection 806 for the couch represented in the image. Based on the received selections, one or more images that contain visually similar objects are determined and weighted, as discussed above with respect to FIG. 7. In this example, because multiple objects were selected (some positive and some negative), the additional images are processed to identify images that have the highest visual similarity to the representation of the chair and the rug, but do not have a visual similarity to the couch.

Figure 8B:
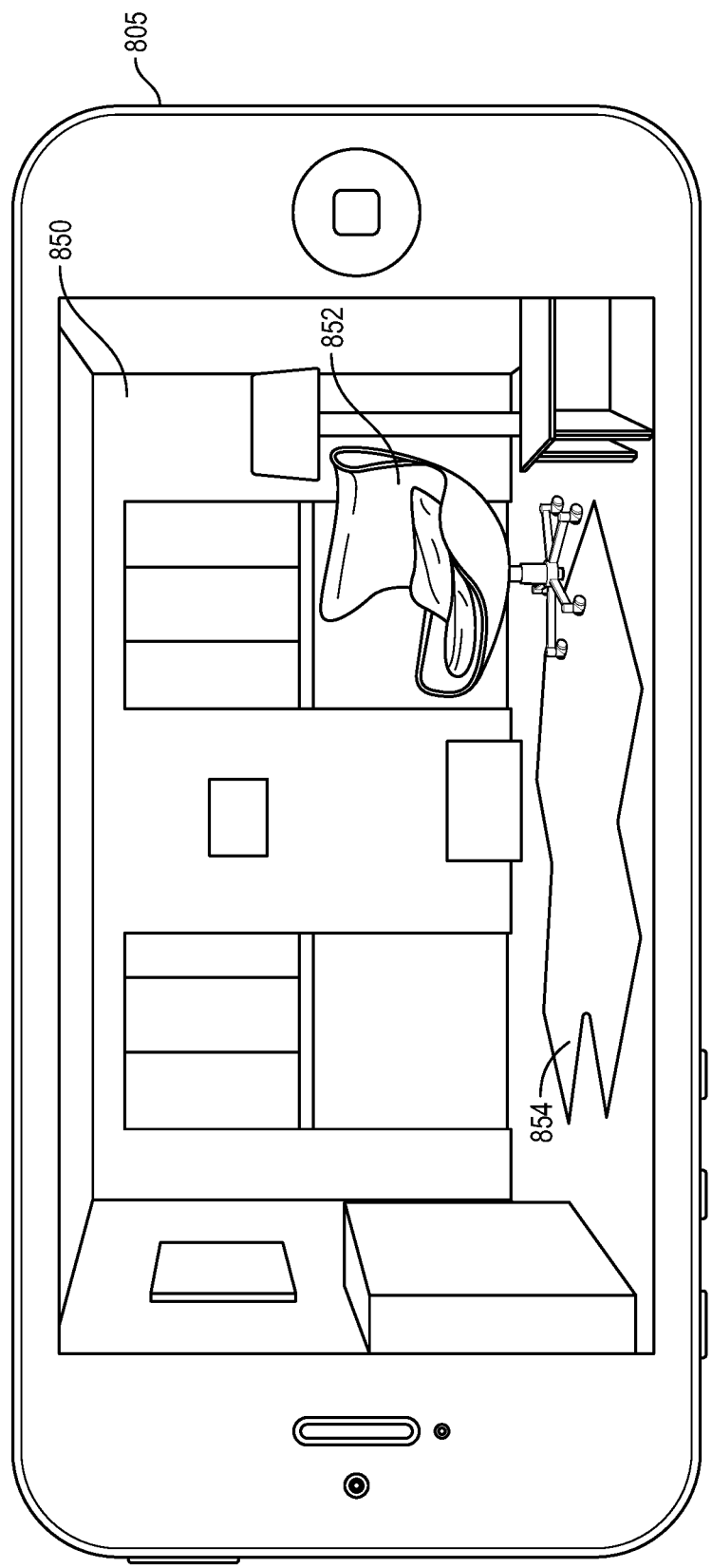
FIG. 8B is a representation of a graphical user interface illustrating a search result return based on a selected object of interest as illustrated in FIG. 8A.

FIG. 8B is a representation of a graphical user interface 850 presented on the client device 805 illustrating a search result return based on the selected objects of interest, as illustrated in FIG. 8A. As illustrated, the image determined to have the highest visual similarity to the selected objects of interest include a chair 852 and a rug 854, which are visually similar to the positively selected chair and the rug from FIG. 8A. Likewise, the graphical user interface 805 does not include a representation of a couch because the couch was negatively selected in FIG. 8A.

Figure 9:
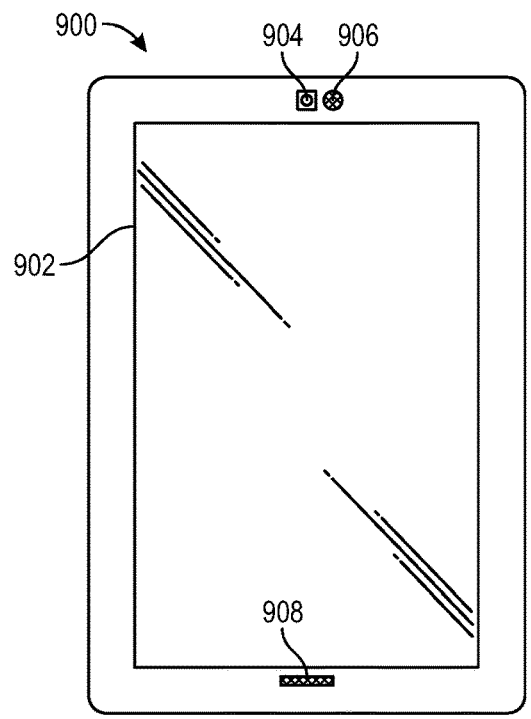
FIG. 9 illustrates an example computing device, according to an implementation.

FIG. 9 illustrates an example client device 900 that can be used in accordance with various implementations described herein. In this example, the client device 900 includes a display 902 and optionally at least one input component 904, such as a camera, on a same side of the device as the display 902. The client device 900 may also include an audio transducer, such as a speaker 906, and optionally a microphone 908. Generally, the client device 900 may have any form of input/output components that allow a user to interact with the client device 900. For example, the various input components for enabling user interaction with the device may include a touch-based display 902 (e.g., resistive, capacitive, Interpolating Force-Sensitive Resistance (IFSR)), camera (for gesture tracking, etc.), microphone, global positioning system (GPS), compass or any combination thereof. One or more of these input components may be included on a device or otherwise in communication with the device. Various other input components and combinations of input components can be used as well within the scope of the various implementations as should be apparent in light of the teachings and suggestions contained herein.

Figure 10:
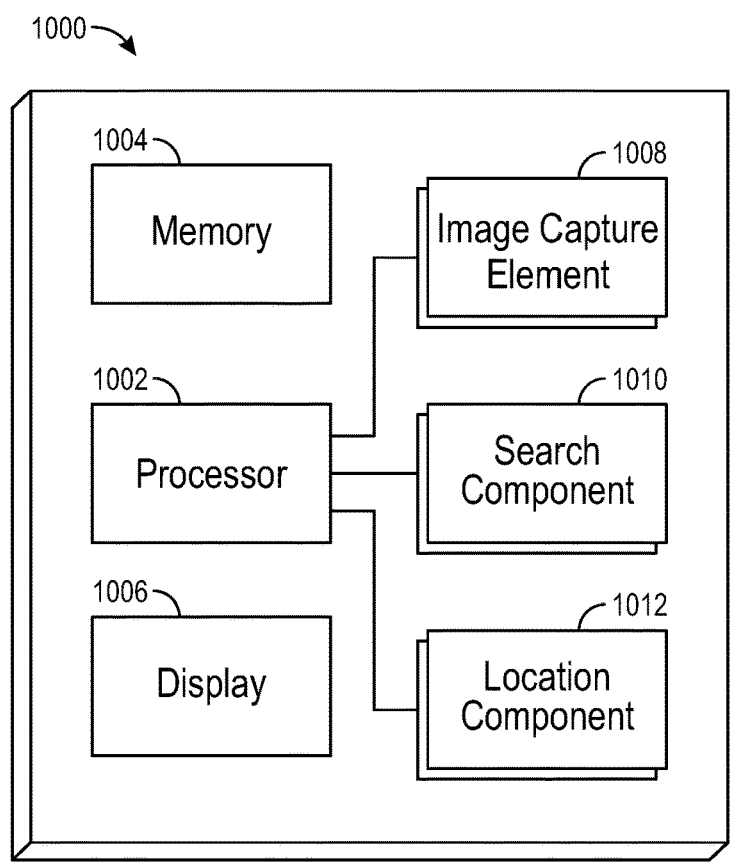
FIG. 10 illustrates an example configuration of components of a computing device, such as that illustrated in FIG. 9.

In order to provide the various functionality described herein, FIG. 10 illustrates an example set of basic components 1000 of a client device 900, such as the client device 900 described with respect to FIG. 9 and discussed herein. In this example, the device includes at least one central processor 1002 for executing instructions that can be stored in at least one memory device or element 1004. As would be apparent to one of ordinary skill in the art, the device can include many types of memory, data storage or computer-readable storage media, such as a first data storage for program instruction for execution by the processor 1002. Removable storage memory can be available for sharing information with other devices, etc. The device typically will include some type of display 1006, such as a touch-based display, electronic ink (e-ink), organic light emitting diode (OLED) or liquid crystal display (LCD).

As discussed, the device in many implementations will include at least one image capture element 1008, such as one or more cameras that are able to image objects in the vicinity of the device. An image capture element can include, or be based at least in part upon, any appropriate technology, such as a CCD or CMOS image capture element having a determined resolution, focal range, viewable area, and capture rate. The device can include at least one search component 1010 for performing the process of generating search terms, tokens and/or identifying and presenting results matching a selected search term. For example, the client device may be in constant or intermittent communication with a remote computing resource (not shown) and may exchange information, such as selected search terms, digital items, tokens, etc., with the remote computing system as part of the search process.

The device also can include at least one location component 1012, such as GPS, NFC location tracking or Wi-Fi location monitoring. Location information obtained by the location component 1012 may be used with the various implementations discussed herein as a factor in selecting images matching object selections. For example, if the user is in San Francisco and provides a positive selection of a bridge (object) represented in an image, the user's location may be considered as a factor when identifying visually similar objects, such as the Golden Gate Bridge.

The example client device may also include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. These I/O devices could be connected by a wireless, infrared, Bluetooth, or other link as well in some implementations. In some implementations, however, such a device might not include any buttons at all and might be controlled only through touch (e.g., touch-based display), audio (e.g., spoken) commands, or a combination thereof.

FIG. 11 is a pictorial diagram of an illustrative implementation of a server system 1100, such as a remote computing resource, that may be used with one or more of the implementations described herein. The server system 1100 may include a processor 1101, such as one or more redundant processors, a video display adapter 1102, a disk drive 1104, an input/output interface 1106, a network interface 1108, and a memory 1112. The processor 1101, the video display adapter 1102, the disk drive 1104, the input/output interface 1106, the network interface 1108, and the memory 1112 may be communicatively coupled to each other by a communication bus 1110.

The video display adapter 1102 provides display signals to a local display (not shown in FIG. 11) permitting an operator of the server system 1100 to monitor and configure operation of the server system 1100. The input/output interface 1106 likewise communicates with external input/output devices not shown in FIG. 11, such as a mouse, keyboard, scanner, or other input and output devices that can be operated by an operator of the server system 1100. The network interface 1108 includes hardware, software, or any combination thereof, to communicate with other computing devices. For example, the network interface 1108 may be configured to provide communications between the server system 1100 and other computing devices, such as the client device 900.

The memory 1112 generally comprises random access memory (RAM), read-only memory (ROM), flash memory, and/or other volatile or permanent memory. The memory 1112 is shown storing an operating system 1114 for controlling the operation of the server system 1100. A binary input/output system (BIOS) 1116 for controlling the low-level operation of the server system 1100 is also stored in the memory 1112.

The memory 1112 additionally stores program code and data for providing network services that allow client devices 900 and external sources to exchange information and data files with the server system 1100. Accordingly, the memory 1112 may store a browser application 1118. The browser application 1118 comprises computer executable instructions, that, when executed by the processor 1101, generate or otherwise obtain configurable markup documents such as Web pages. The browser application 1118 communicates with a data store manager application 1120 to facilitate data exchange and mapping between the data store 1103, client devices, such as the client device 900, external sources, etc.

As used herein, the term "data store" refers to any device or combination of devices capable of storing, accessing and retrieving data, which may include any combination and number of data servers, databases, data storage devices and data storage media, in any standard, distributed or clustered environment. The server system 1100 can include any appropriate hardware and software for integrating with the data store 1103 as needed to execute aspects of one or more applications for the client device 900, the external sources and/or the Search service 1105. The server system 1100 provides access control services in cooperation with the data store 1103 and is able to generate content such as matching search results, images containing visually similar objects, indexes of images having visually similar objects, and the like.

The data store 1103 can include several separate data tables, databases or other data storage mechanisms and media for storing data relating to a particular aspect. For example, the data store 1103 illustrated includes digital items (e.g., images) and corresponding metadata (e.g., tokens, indexes) about those items. Search history, user preferences, profiles and other information may likewise be stored in the data store.

It should be understood that there can be many other aspects that may be stored in the data store 1103, which can be stored in any of the above listed mechanisms as appropriate or in additional mechanisms of any of the data store. The data store 1103 may be operable, through logic associated therewith, to receive instructions from the server system 1100 and obtain, update or otherwise process data in response thereto.

The memory 1112 may also include the search service 1105. The search service 1105 may be executable by the processor 1101 to implement one or more of the functions of the server system 1100. In one implementation, the search service 1105 may represent instructions embodied in one or more software programs stored in the memory 1112. In another implementation, the search service 1105 can represent hardware, software instructions, or a combination thereof.

The server system 1100, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction in FIG. 11 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing system, comprising:
    at least one processor;
    memory including instructions that, when executed by the at least one processor, cause the computing system to at least:
        process a first image that includes a plurality of objects to detect each of the plurality of objects;
        for each of the plurality of objects, associate a token with the object;
        present the first image that includes the plurality of objects;
        receive a first selection of a first object of the plurality of objects from the first image;
        receive a second selection of a second object of the plurality of objects from the first image;
        determine a first token corresponding to the first object and a second token corresponding to the second object;
        query at least one index maintained in a data store to determine, based at least in part on the first token or the second token, a second image indicated in the at least one index, the second image including a third object having a first visual similarity to the first object and does not include an object having a second visual similarity to the second object, wherein the first visual similarity is based at least in part on at least one of an object type, a color, a size, a shape, a style, a brand, or a texture of the first object and the second visual similarity is based at least in part on at least one of an object type, a color, a size, a shape, a style, a brand, or a texture of the second object; and
        present at least a portion of the second image, wherein the at least a portion of the second image-includes the third object.

2. The computing system of claim 1, wherein the at least a portion of the second image is presented concurrently with the first image.

3. The computing system of claim 1, wherein the instructions when executed further cause the computing system to at least:
    for each of the plurality of objects:
        index the object using a text-based retrieval technique such that the object is included in at least one index maintained in the data store.

4. The computing system of claim 1, wherein the instructions when executed further cause the computing system to at least:
    receive a third selection of a fourth object represented in the first image of the plurality of objects; and
    wherein the second image further includes a fifth object having a third visual similarity to the fourth object, the third visual similarity being based at least in part on at least one of an object type, a color, a size, a shape, a style, a brand, or a texture of the fourth object.

5. The computing system of claim 1, wherein the instructions when executed further cause the computing system to at least:
    present on the first image, a graphical representation of a selection control identifying that an object included in the first image may be selected.

6. The computing system of claim 1, wherein the instructions when executed further cause the computing system to at least:
    receive a third selection of a fourth object of the plurality of objects from the first image;
    determine that the second image includes a fifth object having a third visual similarity to the fourth object, the third visual similarity being based at least in part on at least one of an object type, a color, a size, a shape, a style, a brand, or a texture of the fourth object; and
    wherein the presented at least a portion of the second image includes at least a portion of the fifth object.

7. The computing system of claim 1, wherein the instructions, when executed by the at least one processor, further cause the computing system to at least:
    determine a first similarity score corresponding to the first visual similarity of the first object and the third object;
    receive a third selection of a fourth object of the plurality of objects from the first image;
    determine a second similarity score corresponding to a third visual similarity of the fourth object and a fifth object included in the second image; and
    determine a combined similarity score corresponding to the second image, the combined similarity score being based at least in part on a combination of the first similarity score and the second similarity score,
    wherein the third visual similarity is based at least in part on at least one of an object type, a color, a size, a shape, a style, a brand, or a texture of the fourth object.

8. A computer-implemented method, comprising:
    processing a first image that includes a plurality of objects to detect each of the plurality of objects;

for each of the plurality of objects, associating a token with the object;
receiving a first selection of a first location within the first image;
receiving a second selection of a second location within the first image;
determining a first token corresponding to a first object represented at the first location;
determining a second token corresponding to a second object represented at the second location;
querying at least one index maintained in a data store to determine, based at least in part on the first token and the second token, a plurality of additional images indicated in the at least one index, each of the plurality of additional images including a representation of an additional object having a first visual similarity to the first object and does not include an object having a second visual similarity to the second object, wherein the first visual similarity is based at least in part on at least one of an object type, a color, a size, a shape, a style, a brand, or a texture of the first object and the second visual similarity is based at least in part on at least one of an object type, a color, a size, a shape, a style, a brand, or a texture of the second object; and
presenting, concurrently with the first image, at least a portion of each of the plurality of additional images.

9. The computer-implemented method of claim 8, wherein the first selection is at least one of a touch-based input on a display, a determined position of a user's gaze, or an input from an input component.

10. The computer-implemented method of claim 8, further comprising:
determining that the first selection is a positive selection; and
determining that the second selection is a negative selection.

11. The computer-implemented method of claim 8, further comprising:
presenting at least one selection control at a location on the first image to identify an object represented in the first image that is selectable.

12. The computer-implemented method of claim 8, further comprising:
presenting adjacent each of the plurality of objects a selection control indicating that the respective object may be selected.

13. The computer-implemented method of claim 8, further comprising:
determining for each of the plurality of additional images a respective similarity score;
ranking each of the plurality of additional images based at least in part on the respective similarity scores; and
wherein presenting includes presenting, concurrently with the first image, at least a portion of the plurality of additional images in an ordered arrangement based at least in part on the respective similarity scores.

14. The computer-implemented method of claim 13, wherein each of the plurality of additional images includes a plurality of additional objects and the respective similarity score for each of the plurality of additional images includes a combination of a plurality of additional object similarity scores, each of the plurality of additional object similarity scores corresponding to a respective additional object similarity score for each of the plurality of additional objects.

15. The computer-implemented method of claim 8, further comprising:

receiving a third selection of a second image from the plurality of additional images;
removing the presentation of the first image; and
presenting the second image.

16. A non-transitory computer-readable storage medium storing instructions that, when executed by at least one processor of a computing system, cause the computing system to at least:
receive a selection of a first representation of a first object included in a first image presented in a first window;
receive a second selection of a third representation of a third object included in the first image;
in response to the selection and the second selection, process a first region of the first image corresponding to the first object to form a first token representative of the first object and process a second region of the first image to form a second token representative of the third object;
query at least one index maintained in a data store to determine, based at least in part on the first token and the second token, a second image indicated in the at least one index, each of the second image including a second representation of a second object having a first visual similarity to the first object and does not include a representation of an object having a second visual similarity to the third object, wherein the first visual similarity is based at least in part on at least one of an object type, a color, a size, a shape, a style, a brand, or a texture of the first object and the second visual similarity is based at least in part on at least one of an object type, a color, a size, a shape, a style, a brand, or a texture of the second object; and
present, in a second window, at least a portion of the second image.

17. The non-transitory computer-readable storage medium of claim 16, further comprising:
receive a third selection of a third representation of a third object included in the first image;
in response to the third selection, process a second region of the first image to form a second token; and
wherein the query of the at least one index is further to determine, based at least in part on the second token, the second representation such that the second representation includes a representation of an object having a third visual similarity to the third object, the third visual similarity being based at least in part on at least one of an object type, a color, a size, a shape, a style, a brand, or a texture of the third object.

18. The non-transitory computer-readable storage medium of claim 16, further comprising:
indexing the first object in the at least one data store.

19. The non-transitory computer-readable storage medium of claim 16, wherein the instructions when executed further cause the computing system to at least:
receive a third selection of the presented at least a portion of the second image; and
present the second image in the first window.

20. The non-transitory computer-readable storage medium of claim 16, wherein the instructions when executed further cause the computing system to at least:
determine a third image that includes a third representation of a third object having a third visual similarity to the first object, the third visual similarity being based at least in part on at least one of an object type, a color, a size, a shape, a style, a brand, or a texture of the first object;

rank the second image and the third image based at least in part on a similarity score associated with each of the second image and the third image; and present, in the second window, a ranked representation of at least a portion of the second image and the third image.

* * * * *